United States Patent [19]

Kamiya et al.

[11] 4,452,866

[45] Jun. 5, 1984

[54] ALUMINUM-BASED ALLOY BEARING

[75] Inventors: Soji Kamiya, Aichi; Takeshi Muraki, Toyota, both of Japan

[73] Assignee: Taiho Kogyo Co., Ltd., Aichi, Japan

[21] Appl. No.: 302,425

[22] PCT Filed: Jan. 9, 1981

[86] PCT No.: PCT/JP81/00003

§ 371 Date: Sep. 3, 1981

§ 102(e) Date: Sep. 3, 1981

[87] PCT Pub. No.: WO81/02025

PCT Pub. Date: Jul. 23, 1981

[30] Foreign Application Priority Data

Jan. 10, 1980 [JP] Japan .................................. 55-851
Jan. 10, 1980 [JP] Japan .................................. 55-852

[51] Int. Cl.$^3$ ...................... C22C 21/00; C22C 21/10; F16C 33/12
[52] U.S. Cl. .................................. 428/653; 420/540; 420/541; 308/DIG. 8
[58] Field of Search .................. 428/653; 75/146, 140, 75/141, 178 AN, 178 AT; 308/DIG. 8; 420/540, 541, 528

[56] References Cited

U.S. PATENT DOCUMENTS

| 652,833 | 7/1900 | Carpenter | 420/540 |
|---|---|---|---|
| 1,120,768 | 12/1914 | Uyeno | 420/540 |
| 1,280,706 | 10/1918 | Gardner | 75/141 |
| 1,582,453 | 4/1926 | Dustan | 420/541 |
| 2,075,090 | 3/1937 | Bonsack et al. | 420/541 |
| 2,075,091 | 3/1937 | Bonsack et al. | 420/540 |
| 2,215,445 | 9/1940 | Vaders | 75/146 |
| 3,161,502 | 12/1964 | Hunsicker | 75/140 |
| 4,153,756 | 5/1979 | Iwahana | 75/140 |
| 4,278,740 | 7/1981 | Nara | 75/140 |
| 4,309,064 | 1/1982 | Fukuoka et al. | 308/DIG. 8 |

FOREIGN PATENT DOCUMENTS

| 101706 | 8/1979 | Japan | 75/140 |
|---|---|---|---|
| 258490 | 9/1926 | United Kingdom | 420/540 |
| 364642 | 1/1932 | United Kingdom | 420/540 |
| 569337 | 5/1945 | United Kingdom | 75/140 |
| 1222262 | 2/1971 | United Kingdom . | |

OTHER PUBLICATIONS

"Effect of Copper, Silicon and Zinc on the Wear-Resistance of Aluminum Alloys Bearing Containing 20% Tin", Inoshita et al., *Chemical Abstracts*, 87:57043s, 1977.

*Primary Examiner*—L. Dewayne Rutledge
*Assistant Examiner*—John J. Zimmerman
*Attorney, Agent, or Firm*—Burgess, Ryan & Wayne

[57]  ABSTRACT

A tin-containing aluminum alloy is usually pressure-welded to a backing steel plate and used as a bearing. This bearing, however, is defective in that aluminum crystal grains and tin precipitates are coarsened in the alloy structure and the high temperature hardness and fatigue-resistant strength of the bearing alloy are reduced.

The present invention provides an aluminum alloy comprising 2.5 to 25% by weight of tin, 0.5 to 8% by weight of zinc and 1 to 7% by weight of at least one element selected from the group consisting of silicon, chromium, manganese, nickel, iron, zirconium, molybdenum, cobalt, tungsten, titanium, antimony, niobium, vanadium, cerium, barium and calcium, with the balance being substantially aluminum. In the aluminum alloy of the present invention 0.1 to less than 1% by weight of chromium may be incorporated of 1 to less than 1% by weight of chromium may the like. The alloy of the present invention is effectively used as a bearing for a crank shaft of an automobile or the like.

34 Claims, No Drawings

ALUMINUM-BASED ALLOY BEARING

TECHNICAL FIELD

The present invention relates to an aluminum-based alloy bearing. More specifically, the present invention relates to an improvement in a tin-containing aluminum-based alloy bearing which is used as a bearing for an internal combustion engine.

BACKGROUND ART

An aluminum-based alloy bearing of the type described above ordinarily has a structure comprising a tin containing aluminum-based alloy pressure-welded to a backing steel plate. In order to increase the welding strength between the tin-containing aluminum-based alloy and the backing steel plate, it is indispensable to anneal the welded assembly after pressure welding, and this annealing operation is ordinarily carried out for a long time at a temperature lower than the temperature forming an Al-Fe intermetallic compound. However, if the tin-containing aluminum alloy is exposed to such high temperatures at the above annealing step, aluminum crystal grains and tin precipitates are coarsened in the alloy structure, resulting in reduction of the high temperature hardness and fatigue-resistant strength, which are required for a bearing alloy. In order to eliminate the above defects of the tin-containing aluminum alloy, there has been used a bearing aluminum alloy comprising an additive element incorporated in addition to tin. For example, a tin-containing aluminum alloy comprising 3.5 to 4.5% of Sn, 3.5 to 4.5% of Si, and 0.7 to 1.3% of Cu with the balance being Al, a tin-containing aluminum alloy comprising 4 to 8% of Sn, 1 to 2% of Si, 0.1 to 2% of Cu and 0.1 to 1% of ni with the balance being Al, a tin-containing aluminum alloy comprising 3 to 40% of Sn, 0.1 to 5% of Pb, 0.2 to 2% of Cu, 0.1 to 3% of Sb, 0.2 to 3% of Si and 0.01 to 1% of Ti with the balance being Al, a tin-containing aluminum alloy comprising 15 to 30% of Sn and 0.5 to 2% of Cu with the balance being Al, and a tin-containing aluminum alloy comprising 1 to 23% of Sn, 1.5 to 9% of Pb, 0.3 to 3% of Cu and 1 to 8% of Si with the balance being Al (hereinafter referred to as "multi-component system bearing alloys") have been used for vehicles and the like.

Recently, reduction of the size and increase of the output are required in internal combustion engines for automobiles, and furthermore, attachment of an apparatus for reducing a blow-bye gas is required for purging an exhaust gas. Therefore, conditions under which bearings are used become severe. More specifically, the size of bearings has recently been reduced and the bearings are used under higher load and higher temperature conditions than in the past. Accordingly, fatigue fracture and abnormal abrasion readily occur in the conventional multicomponent system bearing alloys and troubles are caused in internal combustion engines for automobiles by these undersirable phenomena. In metal materials, a fatigue phenomenon ordinarily takes place when they are used over a long period of time, but in recent internal combustion engines, fatigue fracture of bearings is sometimes caused even when a high load operation is conducted for a relatively short time. The temperature of a lubricating oil in an internal combustion engine is increased at a high load operation. For example, the temperature of lubricating oil in an oil pan is elevated to 130° to 150° C., and it is therefore presumed that the bearing has a sliding contact with an opposite member, for example, a crank shaft, at a relatively high temperature. In a conventional multicomponent system bearing alloys, the high temperature hardness is drastically reduced by this sliding contact at high temperatures, and melting or migration of the tin phase is caused in the multicomponent system bearing alloys. We believe that the fatigue-resistant strength is reduced in the multicomponent system bearing alloys because of such reduction of the high temperature hardness and melting or migration of the tin phase.

In recent internal combustion engines, in order to reduce the cost of shafts such as crank shafts, customary shafts of forged steel tend to be replaced by ductile cast iron shafts having a low processing cost and the surface roughness of the shafts tends to increase. On the machine-processed surfaces of ductile cast iron shafts, there are left many cavities formed by shaving and removal of graphite particles at the machine processing, and abnormal abrasion is caused on the surfaces of the bearings because of the edges of these cavities, resulting in fatigue fracture. This is an unavoidable defect of the conventional multicomponent system bearing alloys.

With a view to improving properties of tin-containing aluminum alloys by incorporating various additive elements, we proposed a tin-containing aluminum alloy having chromium and copper incorporated therein in Japanese patent application No. 2690/77 and a tin-containing aluminum alloy having chromium, copper and lead and/or indium in Japanese patent application No. 18225/77. Furthermore, we found that when at least one element selected from silicon, manganese, antimony, titanium, nickel, iron, zirconium, molybdenum and cobalt is incorporated in a tin-containing aluminum alloy and is dispersed and precipitated therein, the hardness and abrasion resistance can be improved, and we proposed this improved alloy in Japanese patent application No. 84233/78.

DISCLOSURE OF THE INVENTION

It is an object of the present invention to provide an aluminum alloy bearing which is suitable for an internal combustion engine in which the sliding contact temperature is higher than in the conventional internal combustion engines and shafts of forged steel tend to be replaced by ductile cast iron shafts.

In accordance with one aspect of the present invention, there is provided a bearing which comprises a bearing layer formed of an aluminum alloy comprising 2.5 to 25% by weight of tin, 0.5 to 8% by weight of zinc and 1 to 7% by weight of at least one element selected from the group consisting of silicon, chromium, manganese, nickel, iron, zirconium, molybdenum, cobalt, tungsten, titanium, antimony, niobium, vanadium, cerium, barium and calcium, with the balance being substantially aluminum (hereinafter referred conveniently to as "Al-Si alloy").

In accordance with another aspect of the present invention, there is provided an alloy which comprises a bearing layer formed of an aluminum alloy comprising 2.5 to 25% by weight of tin, 0.5 to 8% by weight of zinc and 0.1 to less than 1.0% by weight of chromium (hereinafter referred conveniently to as "Al-low Cr alloy").

In the Al-Si alloy of the present invention, by dispersing and precipitating such precipitation elements as silicon and chromium, the high temperature hardness, abrasion resistance and fatigue-resistant strength can be improved over those of conventional tin-containing aluminum alloys while maintaing the conformability or break-in property at a level comparable to that of conventional tin-containing aluminum alloys. Furthermore, the aluminum matrix is reinforced by zinc, and the high temperature hardness and fatigue-resistant strength can further be enhanced. In the Al-low Cr alloy of the present invention, chromium is dispersed in the matrix in the form of a very fine and hard Al-Cr intermetallic compound and prevents coarsening of tin particles and other effects described hereinafter.

In the Al-Si alloy and Al-low Cr alloy of the present invention, the bearing characteristics of the aluminum alloy are remarkably improved by synergistic effects of reinforcement of the matrix and reinforcement of the alloy by finely dispersed precipitated elements over the bearing characteristics attained by either of these two reinforcements separately.

The respective components of the alloys of the present invention will now be described in detail.

Tin softens the aluminum alloy and imparts the lubricating property and the conformability or break-in property suitable for a bearing to the aluminum alloy. Incidently, the term "conformability or break-in property" means such a property of a bearing that fine convexities and concavities of a shaft as an opposite member of the bearing, which are formed more or less according to the processing precision, are leveled by the embedding action of the bearing, that is, at the initial stage of the use of the bearing, the surface of the bearing is shaven off so that both the bearing and the shaft are always kept in contact with each other in the state where a film of lubricating oil is always present between the leveled surface of the shaft and the shaven surface of the bearing. If the content of tin exceeds 25% both the conformability and lubricating property of the aluminum alloy are improved but the hardness is reduced. On the other hand, if the tin content is lower than 2.5%, the aluminum alloy is too hard as the bearing alloy and the conformability is reduced. In order to impart sufficient fatigue-resistant strength and high temperature hardness required for bearings for internal combustion engines to a tin-containing aluminum alloy, it is ordinarily necessary that tin should be finely dispersed in the alloy. In an ordinary Sn-Al binary alloy, if the tin content exceeds 15%, tin particles tend to coarsen (namely, it becomes difficult to finely divide tin particles), and it has been considered that the hardness of the Sn-Al binary alloy is reduced for this reason. In the present invention, however, by the addition of precipitating elements, even if tin is incorporated in an amount of up to 25%, no practical disadvantage is brought about when the alloy is used as a bearing for an internal combustion engine. The amount of tin added is selected within the range of from 2.5 to 25% by weight according to the intended use of the bearing, but ordinarily, as the load imposed on the bearing is high, that is, when the explosion load imposed on the bearing by a piston of the internal combustion engine is high, the tin content is preferably maintained at a low level, for example, 5 to 10%, and when the load imposed on the bearing is low, the tin content is preferably increased. Deformation of the bearing is caused by the load imposed on the bearing, and the resistance of the bearing to this deformation is called "load capacity". This load capacity is ordinarily of no substantial significance, but when there is a risk of seizure due to a high load and a high speed rotation, it is preferred that the tin content be increased to, for example, 15 to 25% by weight.

In the Al-Si alloy of the present invention, an element(s) selected from the group consisting of silicon, chromium, manganese, nickel, iron, zirconium, molybdenum, cobalt, tungsten, titanium, antimony, niobium, vanadium, cerium, barium and calcium is precipitated in the aluminum matrix. Such precipitating elements are precipitated in elemental form or in the form of an intermetallic compound of the precipitating elements or an intermetallic compound of aluminum and at least one of these precipitating elements. By incorporation of such precipitating elements, the abrasion resistance is improved irrespectively of the precipitation form. The hardness of such precipitates is very high and the Vicker's hardness of the precipitates is from 700 to 800. The hard precipitates exert an especially high improvement of the abrasion resistance when the opponent shaft is formed of ductile cast iron.

The precipitating elements inhibit growth of crystal grains of aluminum at high temperatures, in the production of a bearing and in use of the bearing, and they promote fine and homogeneous dispersion of tin particles. This effect is dependent on the precipitating elements but is especially prominent when the amount added is small. If the content of the precipitating element (the total amount when two or more of the precipitating elements are incorporated) is lower than 1%, the amount of precipitates is too small and no substantial effect of improving the abrasion resistance can be attained. If the content of the precipitating element exceeds 7%, precipitates become too coarse, and the mechanical strength characteristics of the aluminum alloy, for example, the toughness and fatigue-resistant strength, are reduced and rolling becomes difficult. In this event, since the rolling workability is degraded, it becomes difficult to disperse tin particles finely and uniformly by rolling. It is ordinarily preferred that the precipitating element be incorporated in an amount of 1.5 to 4.0%.

In the Al-low chromium alloy of the present invention, chromium increase the hardness of the aluminum alloy, prevents softening of the aluminum alloy at high temperatures and also prevents coarsening of tin particles at annealing temperatures in bonding the bearing alloy to a backing metal of the bearing. The effects of increasing the hardness and preventing softening at high temperatures will first be described. If the chromium content is lower than 0.1%, attainment of these effects, particularly the effect of preventing softening at high temperatures, cannot be expected. If the chromium content exceeds 1.0%, as described hereinafter, the Al-Cr intermetallic compound is hardly dispersed finely and uniformly and the effects of chromium are reduced.

The chromium effect of preventing softening at high temperatures by chromium, that is, the effect of preventing abrupt reduction of the high temperature hardness of the aluminum alloy, will now be described in detail. A part of the chromium is solid-dissolved in the aluminum matrix to bring about solid solution hardening of the aluminum matrix and elevate the recrystallization temperature, whereby the recrystallization softening temperature is shifted to a higher temperature side. Furthermore, the work hardenability of the aluminum alloy is increased by addition of chromium, and if the alloy is subjected to cold rolling more than one time, the hardness is remarkably enhanced over the hardness of the as-cast alloy. The function of increasing the recrystallization temperature by chromium is especially effective and advantageous because even at a high temperature to which the bearing of an internal combustion engine is exposed (an oil pan temperature of 130° to 150° C.), the mechanical characteristics of the chromium-containing alloy are stable. Especially, reduction of the temperature dependency of the hardness by incorporation of chromium results in improvement of the strength characteristics (fatigue-resistant strength and load capacity) of the bearing at high temperatures. A part of the chromium is solid-dissolved in the aluminum matrix and the remainder of chromium, that is, the portion exceeding the solid-soluble limit, is precipitated in the form of an Al-Cr intermetallic compound. This Al-Cr intermetallic compound is a hard precipitate having a Vicker's hardness of about 370, and if this intermetallic compound is finely and uniformly dispersed in the aluminum matrix, the high temperature hardness is effectively maintained at a high level. The chromium content producing such a fine and uniform dispersion of the hard precipitate is in the range of from 0.1 to 1.0% weight.

The effect of preventing coarsening of tin particles in the Al-low Cr alloy by chromium will now be described. Coarsening of tin particles is a phenomenon caused when a tin-containing aluminum alloy is exposed to high temperatures and movement of the grain boundary of aluminum and melting or migration of tin particles take place. Shifting of the grain boundary of aluminum includes not only shifting relative to initiation of recrystallization but also to coasening of crystal grains. Various causes may be considered for migration of tin particles. For example, when crystal grains of aluminum move, adjoining tin particles migrate so that they may be stabilized by integration with crystal grains of aluminum, and furthermore, at high temperatures, tin particles are deformed so that they may take a more stabilized form. A part of the chromium incorporated in an amount of 0.1 to 1.0% in the Al-low Cr alloy of the present invention forms a uniformly dispersed precipitate as described hereinbefore, and it is believed that by the presence of this precipitate, movement of the grain boundary of aluminum is directly prevented and movement, that is, coarsening, of tin particles is indirectly prevented during annealing or use. This results in the fine form of tin particles finely divided by repetition of cold rolling and annealing of the aluminum alloy can substantially be maintained while the bearing is being used and the fatigue-resistant strength and high temperature hardness required for a bearing of an internal combustion enging can also be maintained. This effect of preventing coarsening of tin particles is attained even when the tin content is low, but this effect is prominent when the tin content is high (at least about 10%) and the effect is especially conspicuous when the tin content is at an especially high level of at least about 15% where tin particles go to coarsen while being made contiguous to one another. Furthermore, it is believed that tin particles are retained in the fine state in the aluminum matrix which is effective for preventing exudation of tin particles. More specifically, the melting point of pure tin is 231° C., and since the temperature of the sliding surface of the bearing of an internal combustion engine sometimes exceeds the melting point of tin during the sliding contact and the temperature to which the bearing is exposed during the ordinary operation is close to the melting point of tin, plastic flow is readily caused in tin particles by the load imposed on tin particles by the shaft and in extreme cases, there is the risk of melting the tin particles. However, if tin particles are kept in the finely dispersed state as pointed out above, it is believed that even when the tin particles are molten or rendered prominently flowable, the tin particles are not influenced so seriously that the hardness of the entire alloy is drastically reduced. Accordingly, as pointed out above, reduction of the high temperature hardness of the aluminum alloy can be prevented even at high temperatures adopted for annealing or exposed when the bearing is used, with the result that the fatigue-resistant strength of the aluminum alloy can be improved. As described in detail hereinbefore, if chromium is incorporated in such a small amount as 0.1 to 1%, the properties of the alloy bearing are effectively improved. In the Al-Si alloy of the present invention, if 0.1 to 1% of chromium is incorporated in combination with other precipitating element so that the total amount of chromium and precipitating element is higher than 1%, there can be provided an aluminum alloy having high abrasion resistance and fatigue-resistant strength, which is suitable as a bearing for a recent internal combustion engine in which shafts of cast iron such as ductile cast iron are used.

In the Al-Si alloy and Al-low Cr alloy of the present invention, the solid-soluble limit of zinc in aluminum is relatively high, and if zinc is incorporated in the amount specified in the present invention, zinc is substantially solid-dissolved in the aluminum matrix. A binary system alloy formed by incorporating a small amount of zinc into aluminum is ordinarily poor in strength and use of this alloy is not pratical. Therefore, an aluminum alloy which is arranged so that an Al-Zn-X ternary intermetallic compound (X stands for a third element) is precipitated is used. The present invention intends to improve the fatigue-resistant strength, load capacity and high temperature hardness by reinforcement of the aluminum matrix owing to incorporation of zinc, which reinforcement is different from the precipitation reinforcement of the conventional zinc-containing aluminum alloy. Zinc is ordinarily called "a low-melting-point metal" as well as tin, but the melting point of zinc is higher than that of tin and the conformability of zinc is lower than that of tin. Accordingly, when a zinc-containing alloy free of tin is used as a bearing, it is necessary to apply a lead type overlay to this alloy. In contrast, if zinc is incorporated in a tin-containing aluminum alloy as in the present invention, the conformability is not impaired by incorporation of zinc but the above-mentioned various properties such as the fatigue-resistant strength are improved. Therefore, the alloy of the present invention can be used as a bearing without the overlay. Incidentally, precipitates are formed because of incorporation of precipitating elements and chromium as pointed out hereinbefore, and by virtue of chromium, the matrix is reinforced and the recrystallization temperature of the aluminum alloy is increased. This is a premise necessary for zinc to exert the above-mentioned functions and effects.

In the Al-Si alloy and Al-low Cr alloy of the present invention, at least one member selected from copper and magnesium may be incorporated in an amount of 0.1 to 2.0% in addition to the above-mentioned ingredients. This alloy will be called "Al-Cu(Mg) alloy" hereinafter. The effect of moderating reduction of the hardness at high temperatures by the single addition of Si or Cr is further enhanced by the addition of copper and/or magnesium, and the absolute value of the hardness is increased by addition of copper and/or magnesium, with the result that the fatigue-resistant strength of the bearing is further improved. If the content of copper and/or magnesium (the total content when copper and magnesium are added) is lower than 0.1%, attainment of the effects of preventing reduction of the high temperature hardness and increasing the absolute value of the hardness cannot be expected, and if the content of copper and/or magnesium exceeds 2.0%, the Al-Cu(Mg) alloy becomes too hard, and the rolling workability is reduced and the corrosion resistance to lubricating oils is degraded. The effect of preventing reduction of the high temperature hardness by copper and/or magnesium is such that the high temperature hardness of the Al-Cu(Mg) alloy is hardly reduced even if the alloy is heated at a temperature higher than 200° C., because the precipitating element, such as silicon, and chromium and zinc are also present in this alloy. Namely, the high temperature hardness is hardly degraded, and therefore, the load capacity and fatigue-resistant strength of the bearing can significantly be improved. It is preferred that the content of copper and/or magnesium be 0.2 to 0.8%.

Both of the aluminum alloys of the present invention may further comprise 0.1 to 10%, preferably 0.5 to 5%, of at least one element selected from the group consisting of lead, bismuth, indium, thallium and cadmium (hereinafter referred to as "lead group element"). The alloy of this type will be called "Al-Pb alloy" hereinafter. When the above-mentioned lead group element is incorporated in an Al-Sn binary alloy, this additive element is ordinarily alloyed in tin particles to lower the melting point of the tin particles, with the result that movement and melting of the tin particles readily occurs and the tin particles are likely to become coarse particles. Therefore, if a conventional Al-Sn-Pb ternary alloy is used for a bearing, the alloy is partially molten and peeled when the high load operation is continued. In contrast, when the Pb group element is incorporated in the Al-Si alloy or Al-low Cr alloy of the present invention, since the precipitating element and chromium are incorporated, particles of tin, the lead group element or alloys thereof, which are finely divided by cold rolling, can be kept in the finely divided state even at high temperatures by the presence of the precipitating element and chromium, and therefore, melting of these particles is not brought about. In the present invention, high lubricating property, abrasion resistance and conformability are imparted to the Al-Pb alloy by tin, the lead group element or alloys thereof.

As in case of conventional aluminum alloys, the aluminum alloy of the present invention is subjected to cold rolling and annealing and pressure-welded to a backing steel plate and is used as a bearing layer which is to be caused to fall in direct contact with a shaft. At the cold rolling step, the thickness reduction ratio at one stage is 5 to 50%, and the overall thickness reduction ratio is determined so that a desired thickness can be obtained. After the cold rolling operation, annealing is carried out at a temperature of 270° to 350° C. to remove the working stress and form precipitates of intermetallic compounds and the like. During the cold rolling operation, tin particles are finely divided as if they were cut into pieces, and while cold rolling and annealing are repeated, tin particles are divided very finely and dispersed uniformly in the aluminum matrix. It is considered that zinc which is solid-dissolved in the aluminum matrix during the cold rolling and annealing steps is not precipitated or dispersed while the bearing is being used. More specifically, tin and zinc are soft metals having a low melting point and are likely to form a eutectic composition and be alloyed. It is preferred that this alloying be obviated as much as possible but zinc be solid-dissolved in an larger amount, or that even if alloying takes place, the size of the Zn-containing tin particles be as small as possible. According to the present invention, by the cold rolling and annealing operations, the tin particles are divided very finely, and for this reason, the above-mentioned effects of Zn can be attained for the first time. Furthermore, at the point when the alloy is pressure-welded to a backing steel plate, chromium incorporated in an amount of 0.1 to 1% is precipitated in the form of an Al-Cr intermetallic compound and presents coarsening of fine particles of tin during the annealing operation conducted after the pressure-welding operation and while the resulting bearing is being used. It is preferred that the average diameter of fine particles of tin in the bearing of the present invention be in the range of from 5 to 30 microns.

The properties of the alloys of the present invention and the conventional alloys and the functions of the alloying elements will now be described in detail with reference to the following Examples.

BEST MODE FOR CARRYING OUT THE INVENTION

Example 1

Samples Nos. 1 through 20 shown in Tables 1-1 and 1-2 given hereinafter are alloys included in the scope of the present invention. These alloys were prepared by melting an aluminum ingot in a gas furnace, adding an Al-Cr mother alloy, Al-Cu mother alloy or Al-Mg mother alloy to the melt, according to the intended composition, then adding at least one member selected from tin, zinc, lead, indium, bismuth, thallium and cadmium to the melt according to the intended composition, blowing a chlorine gas into the melt having the desired composition to effect degasification and casting the melt into a metal mold. The thus obtained ingots were subjected to cold rolling at normal temperatures and annealing at 350° C. repeatedly to form samples having a thickness of 6 mm and a width of 200 mm. The hardness of each sample was measured at room temperature and at 200° C.

The samples were further subjected to cold rolling and annealing and pressure-welded to backing steel plates. Then, annealing was carried out at about 350° C. for bonding to obtain half bearings having a diameter of 52 mm and a width of 20 mm. These half bearings were subjected to a dynamic load bearing fatigue test under the following conditions by using shafts of quenched steel of S55C.

Tester: Soda type dynamic load tester
Sliding speed: 400 to 270 m/min
Lubricating oil: SAE 10W30
Lubricating method: forced lubrication
Lubricating oil temperature: 140±5° C.
Lubricating oil pressure: 5 Kg/cm$^2$
Surface roughness of opposite member (S55C steel): 1 μm
Hardness (Hv) of opposite member: 500 to 600
Surface roughness of bearing: 1 to 3 μm
Number of repetitions of application of load: 10$^7$ times The wearing test of the bearings was carried out under the following conditions.

Tester: super-high pressure seizure tester
Sliding speed: 468 m/min
Load: load was gradually increased at a rate of 1 ton/45 minutes (corresponding to 100 Kg/cm² per 45 minutes), and the test was stopped when load was 500 Kg per cm² of the area of the sample
Lubricating oil: SAE 10W30
Lubricating method: forced lubrication
Lubricating oil temperature: 120±5° C.
Surface roughness of opposite member (S55C steel): 1 μm
Roughness of surface iron portion (exclusive of graphite) of opposite member (ductile cast iron): 1 μm
Hardness (Hv) of opposite member (S55C): 500 to 600
Hardness (Hv) of opposite member (ductile cast iron): 200 to 300

Furthermore, measurement of galling (seizing) loads was carried out under the same conditions as adopted in the above wearing test except that the loads applied to the samples were increased until galling took place.

The measurement results and the compositions of the samples are shown in the following Tables (Table 1-1 and Table 1-2). In these Tables, samples Nos. 21 through 23 are comparative alloys, which were prepared in the same manner as described above.

TABLE 1-1

| Sample No. | Chemical Composition (% by weight) | | | | | | | | | Precipitated Elements and Chromium |
|---|---|---|---|---|---|---|---|---|---|---|
| | Al | Sn | Zn | Pb | Bi | In | Tl | Cd | Cu | Mg | |
| 1 | balance | 25 | 8 | — | — | — | — | — | — | — | Si-2 |
| 2 | " | 6 | 4 | — | — | — | — | — | — | — | Cr-1 |
| 3 | " | 13 | 2 | — | — | — | — | — | — | — | Si-3 |
| 4 | " | 20 | 5 | — | — | — | — | — | — | — | Mn-5 |
| 5 | " | 25 | 0.5 | — | — | — | — | — | — | — | Fe-4 |
| 6 | " | 10 | 3 | — | — | — | — | — | — | — | Mo-2, Co-1 |
| 7 | " | 5 | 4 | — | — | — | — | — | 0.1 | — | Zr-2, Ti-0.5 |
| 8 | " | 12 | 3 | — | — | — | — | — | 0.4 | — | Sb-4 |
| 9 | " | 20 | 1 | — | — | — | — | — | 0.5 | 0.5 | V-3 |
| 10 | " | 10 | 4 | 3 | — | — | — | — | 0.3 | — | Si-2, Cr-0.5 |
| 11 | " | 15 | 3 | 2 | — | 0.5 | — | — | — | — | Zr-2, Ce-2 |
| 12 | " | 20 | 2 | — | — | — | 1 | 9 | — | — | Nb-2, Ba-2 |
| 13 | " | 15 | 2 | — | — | — | — | — | — | — | Cr-0.2, Ca-2 |
| 14 | " | 10 | 3 | — | 3 | — | — | — | 0.5 | — | Si-1.5, Cr-0.1, W-1 |
| 15 | " | 20 | 5 | 1 | — | — | — | — | 2 | — | Ni-3 |
| 16 | " | 7 | 2 | 2 | — | — | — | — | 1 | — | Si-3, Cr-0.7 |
| 17 | " | 13 | 4 | 3 | — | — | — | — | — | — | Si-3, Cr-0.5 |
| 18 | " | 17 | 3 | 5 | — | — | — | — | — | — | Mn-2 |
| 19 | " | 20 | 2 | 2 | — | — | — | — | — | — | Fe-2 |
| 20 | " | 25 | 1 | — | 2 | — | — | — | — | — | Si-5, Cr-0.8 |
| 21 | " | 20 | — | — | — | — | — | — | 1 | — | — |
| 22 | " | 30 | — | — | — | — | — | — | 1 | — | Si-2 |
| 23 | " | — | 4 | 2 | — | — | — | — | 1 | — | Si-1 |

TABLE 1-2

| | Hardness (Hv) | | Fatigue-Resistant Strength (Kg/cm²) | Wear Amount (mg) | | Galling load (Kg/cm²) | |
|---|---|---|---|---|---|---|---|
| Sample No. | normal temperature | 200° C. | | S50C | DCI | S50C | DCI |
| 1 | 35 | 20 | 580 | 0.25 | 0.28 | 600 | 500 |
| 2 | 38 | 23 | 600 | 0.30 | 0.40 | 500 | 450 |
| 3 | 33 | 18 | 560 | 0.20 | 0.22 | 800 | 750 |
| 4 | 42 | 25 | 560 | 0.21 | 0.22 | 800 | 700 |
| 5 | 34 | 18 | 560 | 0.21 | 0.25 | 700 | 600 |
| 6 | 39 | 22 | 560 | 0.23 | 0.28 | 800 | 700 |
| 7 | 42 | 26 | 600 | 0.25 | 0.29 | 700 | 700 |
| 8 | 37 | 19 | 560 | 0.22 | 0.25 | 850 | 800 |
| 9 | 42 | 22 | 580 | 0.28 | 0.32 | 700 | 600 |
| 10 | 45 | 23 | 620 | 0.21 | 0.22 | 950 | 900 |
| 11 | 40 | 23 | 580 | 0.25 | 0.29 | 750 | 650 |
| 12 | 38 | 22 | 560 | 0.25 | 0.29 | 700 | 600 |
| 13 | 36 | 22 | 620 | 0.28 | 0.33 | 800 | 700 |
| 14 | 43 | 21 | 580 | 0.23 | 0.25 | 700 | 650 |
| 15 | 55 | 30 | 560 | 0.25 | 0.29 | 700 | 650 |
| 16 | 49 | 27 | 620 | 0.20 | 0.21 | 1050 | 1000 |
| 17 | 39 | 20 | 600 | 0.19 | 0.20 | 1100 | 1000 |
| 18 | 47 | 24 | 580 | 0.26 | 0.26 | 850 | 750 |
| 19 | 36 | 19 | 560 | 0.26 | 0.29 | 800 | 650 |
| 20 | 42 | 20 | 580 | 0.19 | 0.19 | 1000 | 1000 |
| 21 | 36 | 17 | 540 | 0.40 | 0.78 | 800 | 150 |
| 22 | 32 | 16 | 480 | 0.28 | 0.34 | 900 | 450 |
| 23 | 50 | 22 | 540 | 0.48 | 0.60 | 350 | 350 |

The samples shown in Tables 1-1 and 1-2 will now be described with reference to the hardness characteristics. The hardness at normal temperatures of the Al-Zn-Pb alloy of sample No. 23 (comparison) is relatively high and Hv50. If this sample is compared with samples Nos. 21 and 22, it is seen that the alloy is rendered easily work hardenable under cold rolling conditions by incorporation of zinc. Furthermore, since the zinc content of 4% is below the solid-soluble limit in aluminum, it is seen that this increase of the hardness is due to changes of the properties of the aluminum matrix. When sample No. 23 is compared with samples Nos. 21 and 22, it is seen that the hardness at 200° C. of the former sample is higher than that of the latter samples. The hardness of the alloys comprising the indispensable components of the present invention such as Al, Sn, Zn and Si (samples Nos. 1 through 6) is lower than the hardness of sample No. 23 free of tin. However, it must be noted that even if soft tin is incorporated in a large quantity (especially, sample No. 4 (20%) and sample No. 5 (25%)), the hardness at 200° C. is maintained at a level exceeding Hv18. It is considered that this effect is due to the incorporation of zinc.

The fatigue-resistant strength will now be described. Samples Nos. 1 through 20 according to the present invention are superior to the comparative samples in fatigue-resistant strength. When the comparative tin-containing alloys, that is, samples Nos. 21 and 22, are compared with samples Nos. 1 through 6 according to the present invention, it can be concluded that the fatigue-resistant strength is improved by the presence of zinc and of precipitating elements (such as silicon) and/or chromium. It is believed that zinc having a function of reinforcing the aluminum matrix is effective for improving the fatigue-resistant strength. The fatigue-resistant-strength is relatively high in samples Nos. 2, 10, 13, 16 and 17 containing chromium at a content lower than 1%. It is considered that the fatigue-resistant strength is improved by fine division of tin particles by chromium. The fatigue-resistant strength of sample No. 12 containing large quantities of indium and thallium is not so high. Generally, the fatigue-resistance strength is improved if the aluminum matrix is reinforced so as to increase the high temperature strength, but if a soft phase, such as, tin, is present in a large quantity in the aluminum alloy, the fatigue-resistant strength is reduced (see samples Nos. 4 and 5). However, a relatively high fatigue-resistant strength is obtained in sample No. 20 containing 25% of tin. As pointed out hereinbefore, it is believed that this is due to fine division of tin particles and due to reinforcement of the aluminum matrix by zinc.

The wear amount will now be discussed. It is not true that the wear amounts of all the samples of the present invention with S50C steel are smaller than that of the comparative alloy of sample No. 22. It is believed that the wear amount of this comparative sample is small because the total content of tin and lead rich in the lubricating property is high. Among the samples according to the present invention, those containing lead or bismuth and those having a high tin content show a relatively small wear amount to S50C steel. This means that in the alloy of the present invention comprising Al, Sn, Zn and Si as the indispensable ingredients, the wear amount is predominantly influenced by the contents of lead, bismuth and tin. Since a small wear amount is observed also in sample No. 22, the wear amount is not so decisively influenced by the fine and uniform dispersion state of tin as the fatigue-resistant strength. The wear amounts of all the samples of the present invention, except sample No. 2 (containing chromium), with DCI (ductile cast iron) are smaller than those of the comparative samples. These is observed a tendency that the wear amount with DCI is small as the amounts added of precipitating elements such as Si and other additive elements such as Pb are large. It is believed that the abrasion resistance of the aluminum alloy of the present invention with DCI is imparted first by hard precipitates such as Si and secondarily by the lubricating action of Pb and the like elements.

The seizure load will now be discussed. It is not always true that all the samples of the present invention always have higher seizure loads with S50C steel than those of samples Nos. 21 and 22 having the highest tin content among the comparative samples. The seizure load with steels as well as the abrasion resistance is predominantly influenced by the amount of tin, bismuth and lead. The seizure loads of the samples of the present invention with DCI are comparable to or higher than those of the comparative samples, and samples Nos. 16, 17 and 20 containing lead or like elements have an especially high galling load with DCI, and an increase of the content of silicon or the like tends to result in an increase of the seizure load. From the foregoing experimental facts, it is presumed that (a) the seizing resistance with steels (galling is prevented even at high loads) is predominantly influenced by the amount of hard precipitates such as silicon and of the tin content, while the seizure resistance with DCI is influenced first by the amounts of zinc and lead or the like and secondarily by the amounts of precipitates of silicon or the like if the tin content is maintained at the same level, (b) the seizure resistance with DCI is increased by increase of the tin content but the galling resistance is not increased to such a high level as will allow application of the bearing to an internal combustion engine unless the tin particles are finely and uniformly dispersed in the aluminum matrix, (c) the seizure resistance to steels is not substantially influenced by the dispersion state of tin and (d) the seizure resistance of an aluminum alloy having an excellent abrasion resistance is not always high. The abrasion resistance of an aluminum alloy is mainly influenced by the composition of the alloy, while the galling resistance is mainly influenced by the structure of the alloy.

Example 2

Samples shown in Tables 2-1 and 2-2 were prepared and tested under the same conditions as adopted in Example 1.

TABLE 2-1

| Sample No. | Chemical Composition (% by weight) | | | | | | | | | |
|---|---|---|---|---|---|---|---|---|---|---|
| | Al | Sn | Zn | Cr | Pb | Bi | In | Tl | Cd | Cu | Mg |
| 24 | balance | 2.5 | 8 | 0.3 | — | — | — | — | — | — | — |
| 25 | " | 7 | 5 | 0.1 | — | — | — | — | — | — | — |
| 26 | " | 12 | 1.5 | 0.7 | — | — | — | — | — | — | — |
| 27 | " | 17 | 0.5 | 1.0 | — | — | — | — | — | — | — |
| 28 | " | 25 | 3 | 0.5 | — | — | — | — | — | — | — |
| 29 | " | 7 | 4 | 0.2 | — | 7 | — | — | — | — | — |
| 30 | " | 13 | 2 | 0.5 | 2 | — | — | — | — | — | — |
| 31 | " | 20 | 6 | 0.8 | — | — | 0.5 | — | — | — | — |
| 32 | " | 5 | 1 | 0.1 | — | — | — | 1 | 9 | — | — |
| 33 | " | 6 | 4 | 0.3 | 3 | — | — | — | — | 0.3 | — |
| 34 | " | 10 | 2 | 0.5 | — | — | — | — | — | 2.0 | — |
| 35 | " | 15 | 6 | 0.8 | 1 | — | — | — | — | 0.5 | 0.5 |
| 36 | " | 10 | 4 | 0.3 | 2 | — | — | — | — | 1.0 | — |
| 37 | " | 5 | 6 | 0.2 | — | — | — | — | — | 0.1 | — |
| 38 | " | 10 | 2 | 0.5 | 5 | — | — | — | — | 0.3 | — |
| 39 | " | 25 | 1 | 0.8 | — | — | — | — | — | 2.0 | — |
| 40 | " | 15 | 4 | 0.4 | — | — | — | — | — | — | 1.0 |
| 41 | " | 20 | — | — | — | — | — | — | — | 1.0 | — |
| 42 | " | 17 | — | — | 2 | — | — | — | — | 0.5 | — |
| 43 | " | — | 4 | — | 3 | — | — | — | — | 1 | — |

TABLE 2-2

| Sample No. | Hardness (Hv) | | Fatigue-Resistant Strength (Kg/cm²) | Wear Amount (mg) | Galling Load (kg/cm²) |
|---|---|---|---|---|---|
| | normal temperature | 200° C. | | | |
| 24 | 38 | 22 | 620 | 0.40 | 500 |
| 25 | 36 | 20 | 600 | 0.40 | 700 |
| 26 | 35 | 21 | 620 | 0.30 | 800 |
| 27 | 38 | 23 | 600 | 0.30 | 800 |
| 28 | 34 | 20 | 600 | 0.30 | 1000 |
| 29 | 36 | 18 | 600 | 0.25 | 1100 |
| 30 | 36 | 20 | 620 | 0.28 | 1100 |
| 31 | 37 | 22 | 600 | 0.40 | 1050 |
| 32 | 35 | 20 | 580 | 0.38 | 800 |
| 33 | 40 | 23 | 640 | 0.28 | 950 |
| 34 | 50 | 32 | 680 | 0.35 | 700 |
| 35 | 55 | 33 | 680 | 0.27 | 900 |
| 36 | 45 | 26 | 680 | 0.25 | 850 |
| 37 | 36 | 22 | 620 | 0.42 | 700 |
| 38 | 38 | 19 | 640 | 0.25 | 900 |
| 39 | 48 | 26 | 660 | 0.30 | 800 |
| 40 | 48 | 27 | 640 | 0.34 | 800 |
| 41 | 36 | 17 | 540 | 0.40 | 800 |
| 42 | 34 | 16 | 520 | 0.32 | 900 |

TABLE 2-2-continued

| Sample No. | Hardness (Hv) normal temperature | 200° C. | Fatigue-Resistant Strength (Kg/cm²) | Wear Amount (mg) | Galling Load (kg/cm²) |
|---|---|---|---|---|---|
| 43 | 46 | 20 | 540 | 0.52 | 350 |

Samples shown in Tables 2-1 and 2-2 will now be described first with reference to the hardness characteristics. The hardness of the Al-Zn-Pb alloy of sample No. 43 (comparative sample) is relatively high and Hv46 at normal temperatures. When this alloy is compared with samples Nos. 41 and 42, it is seen that the alloy is rendered easily work hardenable under cold rolling conditions by incorporation of zinc. Since the zinc content of 4% is lower than the solid-soluble limit of zinc in aluminum, it is understood that the above change is due to changes of the properties of the aluminum matrix. When sample No. 43 is compared with samples Nos. 41 and 42, it is seen that the hardness at 200° C. of the former sample is higher than those of the latter samples. It cannot be judged that alloys comprising indispensable components of the present invention, that is Al, Sn, Zn and Cr, (sample Nos. 24 through 28) are always highly excellent over the tin-free comparative sample (sample No. 43) with respect to the hardness. However, it must be noted that although the alloy of the present invention contains soft tin in a large amount (especially, sample No. 28 having a tin content of 25%), the hardness at 200° C. is higher than Hv20. It is believed that this is due to reinforcement of the aluminum matrix by zinc and prevention of coarsening of tin particles by hard and fine particles of chromium. This high temperature hardness maintaining effect is especially conspicuous in samples Nos. 33 through 35 containing copper and/or magnesium. When chromium-free samples Nos. 41 through 43 are compared with samples Nos. 33 and 34, it is seen that the high temperature hardness maintaining effect is realized in the presence of chromium.

The fatigue-resistant strength will now be described. Samples Nos. 24 through 40 according to the present invention are superior to the comparative samples with respect to the fatigue-resistant strength. When tin-containing comparative alloys (samples Nos. 41 and 42) are compared with samples Nos. 24 through 40 of the present invention, it can be concluded that the fatigue-resistant strength is improved by the presence of zinc and chromium. In the samples containing copper alone or with magnesium, the fatigue-resistant strength is highly improved, but in sample No. 32 containing indium and thallium, the fatigue-resistant strength is not so high. Thus, it is seen that the fatigue-resistant strength of the aluminum alloy is significantly influenced by the kind of additive element. Generally, if it is intended to reinforce the aluminum matrix so as to increase the high temperature strength, the fatigue-resistant strength is improved, but if a soft phase of tin or the like is present in a large quantity in the aluminum alloy, the fatigue-resistant strength is reduced (see samples Nos. 42 and 43). In contrast, in sample No. 28 of the present invention containing 25% of tin, the fatigue-resistant strength is remarkably enhanced by fine division of tin particles and reinforcement of the aluminum matrix by zinc as repeatedly described hereinbefore. One of prominent features of the bearing aluminum alloy of the present invention is that since the tin content is high as pointed out above, the conformability, lubricating property and fatigue-resistant strength are excellent.

The wear amount will now be discussed. It is not always true that the wear amounts of all the samples of the present invention are always smaller than the wear amount of sample No. 42 (comparative sample). It is believed that since the total content of tin and lead, having a very good lubricating property, is high in this comparative sample, the wear amount is small. Among the samples of the present invention, those containing lead or bismuth and those having a high tin content show a relatively small wear amount. This means that in the alloys of the present invention containing Al, Sn, Zn and Cr as indispensable ingredients, the wear amount is predominantly influenced by the contents of lead, bismuth and tin. Incidentally, since a small wear amount is observed also in sample No. 42, it is seen that the wear amount is not so decisively influenced by the fine and uniform dispersion state of tin as the fatigue-resistant strength and hardness.

The seizure load will now be discussed. It is not always true that all the samples of the present invention always have a higher galling load than that of sample No. 41 having the highest tin content among the comparative samples. The seizure load, as well as the abrasion resistance, is predominantly influenced by the contents of tin, bismuth and lead.

INDUSTRIAL APPLICABILITY

When the alloy of the present invention is compared with the conventional alloys generally with respect to the high temperature hardness, fatigue-resistant strength, abrasion resistance and galling resistance, it is judged that the alloy of the present invention is excellent as a bearing for a recent internal combustion engine over the conventional alloys, and according to the present invention, the reliability of the bearing is improved and the life of the bearing is prolonged.

We claim:

1. A bearing having a bearing layer formed by the steps of casting and then rolling and annealing an aluminum alloy, said alloy comprising 5.0 to 25% by weight of tin, 0.5 to 8% by weight of zinc substantially solid-dissolved in the aluminum matrix and 1 to 7% by weight of at least one element selected from the group consisting of silicon, chromium, manganese, nickel, iron, zirconium, molybdenum, cobalt, tungsten, titanium, antimony, niobium, vanadium, cerium, barium and calcium, with the balance being substantially aluminum.

2. A bearing as set forth in claim 1, wherein said aluminum alloy is bonded to a backing steel plate by pressure welding and annealing.

3. A bearing as set forth in claim 2, wherein said aluminum alloy comes in contact through a film of a lubricating oil with a steel or cast iron shaft driven by a piston of an internal combustion engine.

4. A bearing as set forth in claim 1 wherein tin is present in the form of particles having an average diameter of between about 5 and 30 microns.

5. A bearing as set forth in claim 1 wherein the step of annealing is carried out at a temperature of between 270° and 350° C.

6. A bearing as set forth in claim 1 wherein said bearing layer is formed by the steps of cold rolling and annealing.

7. A bearing as set forth in claim 6 further comprising conducting the step of cold rolling at least twice.

8. A bearing as set forth in claim 1 further comprising a bearing layer formed by the steps of cold rolling at least once and annealing at a temperature of between 270° and 350° C.

9. A bearing having a bearing layer formed by the steps of casting and then rolling and annealing an aluminum alloy comprising 5.0 to 25% by weight of tin, 0.5 to 8% by weight of zinc, 1 to 7% by weight of at least one element selected from the group consisting of silicon, chromium, manganese, nickel, iron, zirconium, molybdenum, cobalt, tungsten, titanium, antimony, niobium, vanadium, cerium, barium and calcium and 0.1 to 2.0% by weight of at least one element selected from copper and magnesium, with the balance being substantially aluminum.

10. A bearing as set forth in claim 9, wherein said aluminum alloy is bonded to a backing steel plate by pressure welding and annealing.

11. A bearing as set forth in claim 10, wherein said aluminum alloy comes in contact through a film of a lubricating oil with a steel or cast iron shaft driven by a piston of an internal combustion engine.

12. A bearing having a bearing layer formed by the steps of casting and then rolling and annealing an aluminum alloy comprising 5.0 to 25% by weight of tin, 0.5 to 8% by weight of zinc, 1 to 7% by weight of at least one element selected from the group consisting of silicon, chromium, manganese, nickel, iron, zirconium, molybdenum, cobalt, tungsten, titanium, antimony, niobium, vanadium, cerium, barium and calcium and 0.1 to 10% by weight of at least one element selected from the group consisting of lead, bismuth, indium, thallium and cadmium, with the balance being substantially aluminum.

13. A bearing as set forth in claim 12, wherein said aluminum alloy is bonded to a backing steel plate by pressure welding and annealing.

14. A bearing as set forth in claim 13, wherein said aluminum alloy comes in contact through a film of a lubricating oil with a steel or cast iron shaft driven by a piston of an internal combustion engine.

15. A bearing having a bearing layer formed by the steps of casting and then rolling and annealing an aluminum alloy, said alloy comprising 5.0 to 25% by weight of tin, 0.5 to 8% by weight of zinc substantially solid-dissolved in the aluminum matrix, 1 to 7% by weight of at least one element selected from the group consisting of silicon, chromium, manganese, nickel, iron, zirconium, molybdenum, cobalt, tungsten, titanium, antimony, niobium, vanadium, cerium, barium and calcium, 0.1 to 2.0% by weight of at least one element selected from copper and magnesium and 0.1 to 10% by weight of at least one element selected from the group consisting of lead, bismuth, indium, thallium and cadmium, with the balance being substantially aluminum.

16. A bearing as set forth in claim 15, wherein said aluminum alloy is bonded to a backing steel plate by pressure welding and annealing.

17. A bearing as set forth in claim 16, wherein said aluminum alloy comes in contact through a film of a lubricating oil with a steel or cast iron shaft driven by a piston of an internal combustion engine.

18. A bearing as set forth in claim 15 wherein tin is present in the form of particles having an average diameter of between about 5 and 30 microns.

19. A bearing as set forth in claim 15 wherein the step of annealing is carried out at a temperature of between 270° and 350° C.

20. A bearing as set forth in claim 15 wherein said bearing layer is formed by the steps of cold rolling and annealing.

21. A bearing according to claim 20 further comprising conducting the step of cold rolling at least twice.

22. A bearing according to claim 15 further comprising a bearing layer formed by the steps of cold rolling at least once and annealing at a temperature of between 270° and 350° C.

23. A bearing having a bearing layer formed by the steps of casting and then rolling and annealing an aluminum alloy, said alloy comprising 5.0 to 25% by weight of tin, 0.5 to 8% by weight of zinc substantially solid-dissolved in the aluminum matrix and 0.1 to less than 1.0% by weight of chromium, with the balance being substantially aluminum.

24. A bearing as set forth in claim 23, wherein said aluminum alloy is bonded to a backing steel plate by pressure welding and annealing.

25. A bearing as set forth in claim 24, wherein said aluminum alloy comes in contact through a film of a lubricating oil with a steel shaft driven by a piston of an internal combustion engine.

26. A bearing having a bearing layer formed by the steps of casting and then rolling and annealing an aluminum alloy, said alloy comprising 5.0 to 25% by weight of tin, 0.5 to 8% by weight of zinc substantially solid-dissolved in the aluminum matrix, 0.1 to less than 1.0% by weight of chromium and 0.1 to 2.0% by weight of at least an element selected from the group consisting of copper and magnesium, with the balance being substantially aluminum.

27. A bearing as set forth in claim 26, wherein said aluminum alloy is bonded to a backing steel plate by pressure welding and annealing.

28. A bearing as set forth in claim 27, wherein said aluminum alloy comes in contact through a film of a lubricating oil with a steel shaft driven by a piston of an internal combustion engine.

29. A bearing having a bearing layer formed by the steps of casting and then rolling and annealing an aluminum alloy comprising 5.0 to 25% by weight of tin, 0.5 to 8% by weight of zinc, 0.1 to less than 1.0% by weight of chromium, 0.1 to 2.0% by weight of at least one element selected from copper and magnesium and 0.1 to 10% by weight of at least one element selected from the group consisting of lead, bismuth, indium, thallium and cadmium, with the balance being substantially aluminum.

30. A bearing as set forth in claim 29, wherein said aluminum alloy is bonded to a backing steel plate by pressure welding and annealing.

31. A bearing as set forth in claim 30, wherein said aluminum alloy comes in contact through a film of a lubricating oil with a steel shaft driven by a piston of an internal combustion engine.

32. A bearing having a bearing layer formed by the steps of casting and then rolling and annealing an aluminum alloy comprising 5.0 to 25% by weight of tin, 0.5 to 8% by weight of zinc, 0.1 to less than 1.0 % by weight of chromium and 0.1 to 10% of at least one element selected from the group consisting of lead, bismuth, indium, thallium and cadmium, with the balance being substantially aluminum.

33. A bearing as set forth in claim 32, wherein said aluminum alloy is bonded to a backing steel plate by pressure welding and annealing.

34. A bearing as set forth in claim 33, wherein said aluminum alloy comes in contact through a film of a lubricating oil with a steel shaft driven by a piston of an internal combustion engine.

* * * * *